No. 854,588. PATENTED MAY 21, 1907.
J. MILLS.
FILTERING MACHINE.
APPLICATION FILED MAY 7, 1906.

Witnesses.
H. L. Trimble
M. B. Sheffield

Inventor.
John Mills
by Chas H Miles
his attorney

No. 854,588. PATENTED MAY 21, 1907.
J. MILLS.
FILTERING MACHINE.
APPLICATION FILED MAY 7, 1906.
3 SHEETS—SHEET 3.
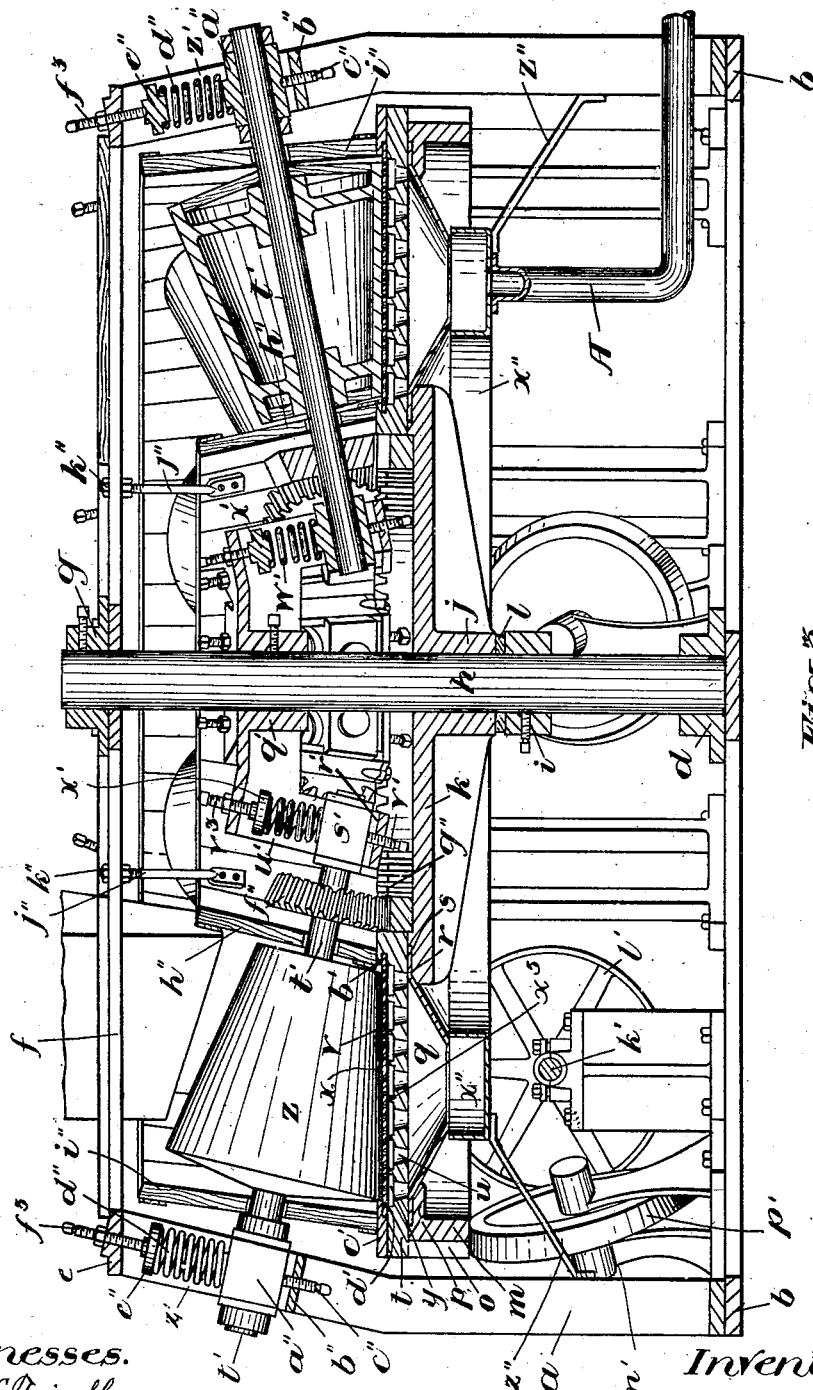
Witnesses.
H. L. Trimble.
B. Sheffield
Inventor
John Mills
by Chas H Miles
his Attorney

UNITED STATES PATENT OFFICE.

JOHN MILLS, OF TORONTO, ONTARIO, CANADA.

FILTERING-MACHINE.

No. 854,588.

Specification of Letters Patent.

Patented May 21, 1907.

Application filed May 7, 1906. Serial No. 315,521.

*To all whom it may concern:*

Be it known that I, JOHN MILLS, of the city of Toronto, in the county of York and Province of Ontario, Canada, have invented certain new and useful Improvements in Filtering-Machines; and I hereby declare that the following is a full, clear, and exact description of the same.

Distillers' slop consists of three principal elements, namely suspended solids, dissolved solids and water. The suspended solids are ordinarily recovered by draining off the water and dissolved solids but when recovered in this way they contain a greater or less percentage of absorbed water which it is necessary to remove so that they can be dried in an economical manner for commercial or feeding purposes.

The present invention relates to a machine particularly designed for the removal of the absorbed water from the suspended solids after their recovery from the water and dissolved solids, and the invention consists essentially of the combination and arrangement of the parts hereinafter described and specifically pointed out in the appended claims.

Figure 1:
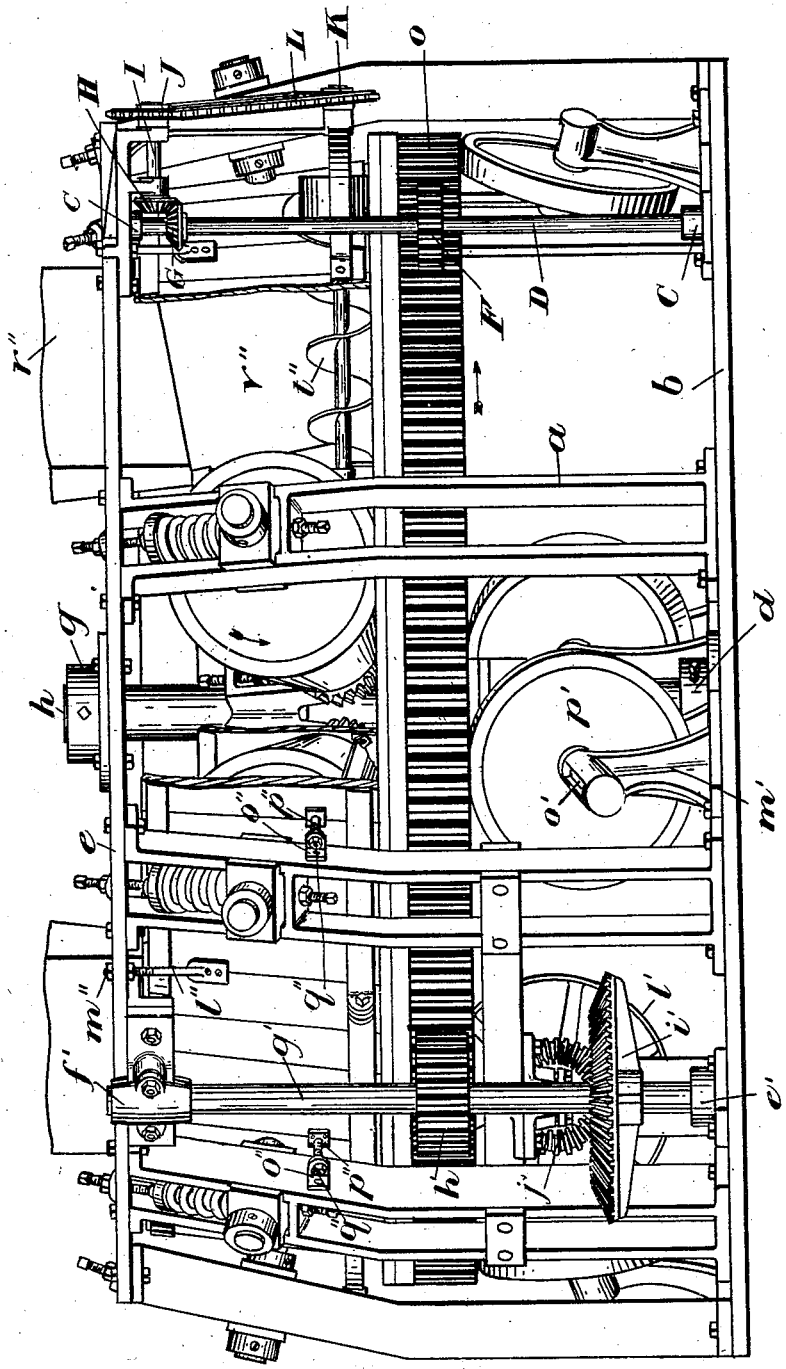
Figure 2:
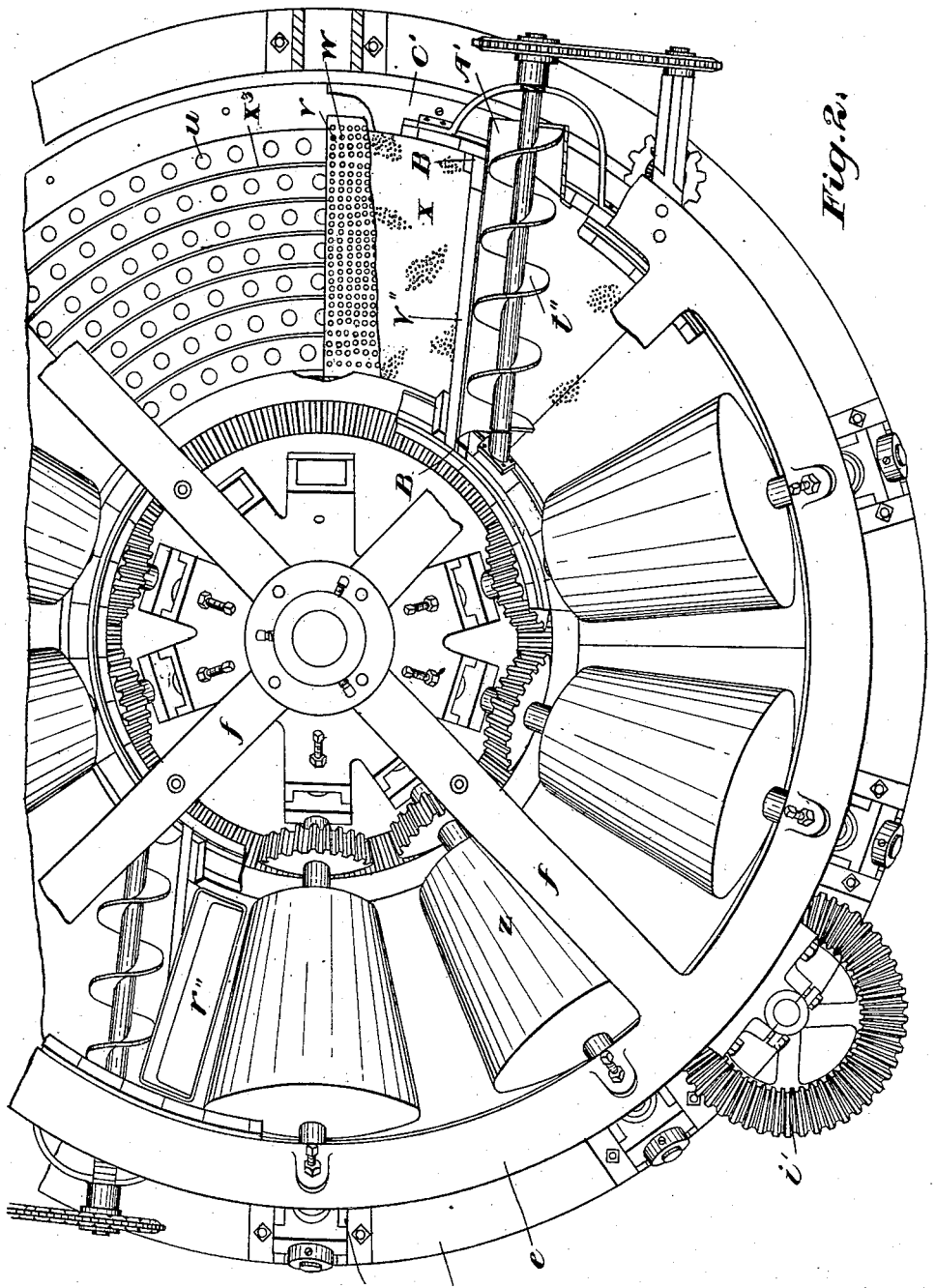

For a full understanding of the invention reference is to be had to the following description and to the accompanying drawings, in which, Figure 1 is a side elevation of the filtering machine partly in section. Fig. 2 is a plan view of the filtering machine partly in section. Fig. 3 is a vertical section.

Like characters of reference indicate like parts throughout the specification and drawings.

The frame of the filtering machine consists of eight standards $a$ bolted at their lower ends to an annular bed plate $b$, and at their upper ends to an annular top plate $e$. The annular top plate $e$ has four radial arms $f$ which terminate in a centrally located hub $g$. Bolted to the center of the annular bed plate $b$ is a hub $d$ alined vertically with the hub $g$ and contained in the hubs $d$ and $g$ is a stationary shaft $h$ provided intermediate its ends with a vertically adjustable but non-revoluble collar $i$. Revoluble around the stationary shaft $h$ above the collar $i$ is the hub $j$ of the rotary plate $k$ and interposed between the hub $j$ and collar $i$ is an anti friction bushing $l$. The rotary plate $k$ is of an annular shape with its rim concentric with the center of the shaft $h$, and constitutes a support for the parts hereinafter described. Concentric with the rotary plate $k$ is an annular spur wheel $o$ comprising a vertically disposed rim $m$ having gear teeth on its outer surface and an annular flange $p$ projecting horizontally from the inner surface of the rim. The top surface of the flange $p$ is in the same horizontal plane as the top surface of the rotary plate $k$ and is separated therefrom by an intervening space. Extending through the space between the flange $p$ and the rotary plate $k$ is an annular drain $q$, cone shaped in cross section with its sides downwardly converging. The top edges of the annular drain $q$ are provided with outwardly flaring flanges $r$ supported in depressed seats $s$ formed in the top surfaces of the rotary plate $k$ and flange $p$. Bridging the space between the rotary plate $k$ and the flange $p$ and bolted thereto is an annular filter bed $t$ having perforations $u$ therein located vertically above the top of the annular drain $q$. Supported upon the filter bed $t$ is a metal filter plate $v$ having perforations $w$ of smaller size than the perforations $u$ and covering the filter plate $v$ is a filter screen $x$ of exceedingly fine mesh. The filter plate $v$ and filter screen $x$ are made in eight sections, but the number of sections can be varied to suit the dimensions of the machine.

The filter bed $t$ has annular ribs $x^3$ triangular in cross section projecting upwardly from its top surface to form channels $y$ above the rows of perforations $u$. The top surfaces of all the ribs $x^3$ are in the same horizontal plane as the top surface of the outer edge of the filter bed, and engage the bottom surface of the filter plate $v$ to rigidly support it and the filter screen $x$ to resist the pressure of the rolls $z$. As shown in Fig. 3 the top surface of the inner edge of the filter bed is above the plane of the top surface of the outer edge of the filter bed and formed in the inner edge of the filter bed is an annular rabbet $b'$ in the same plane as the top surface of the outer edge. The inner edge of the filter plate $v$ is contained in the rabbet $b'$ and its outer edge is supported upon the top surface of the outer edge of the filter bed. Resting upon the outer edge of the filter bed $t$ is an annular clamping plate $c'$ having an annular rabbet $d'$ to contain the outer edge of the filter plate $v$. The clamping plate $c'$ is made in sections corresponding in number and location with the sections of the filter plate $v$ and each section of the clamping plate $c'$ is screwed or bolted to the filter bed $t$. By removing the fastening elements for any section of the clamping plate $c'$ such section can be removed to allow of the removal of the corresponding section of the filter plate $v$ with its filter screen section. When all the clamping plate sections are in position and fastened to the filter bed they securely hold the filter plate sections in their fixed positions on the filter bed so that they may perform the function of assisting the rolls $z$ to squeeze the absorbed water from the suspended solids. Fastened to the annular bed plate $b$ is a vertical bearing box $e'$ and fastened to the annular top plate $e$ vertically above the bearing box $e'$ is a bearing box $f'$ and journaled in the bearing boxes $e'$ and $f'$ is a vertical shaft $g'$. Mounted upon the shaft $g'$ is a spur wheel $h'$ the teeth of which mesh with the teeth of the annular spur wheel $o$, and fitted on the shaft $g'$ between the bearing box $e'$ and spur wheel $h'$ is a bevel gear wheel $i'$ which meshes with the bevel gear $j'$ mounted upon a counter shaft $k'$. The counter shaft $k'$ is provided with a pulley $l'$ driven by a suitable drive belt from a suitable source of power. Bolted to the annular bed plate $b$ at selective places are bearing boxes $m'$ in which are journaled the shafts $o'$ of the idlers $p'$ which support the annular spur wheel $o$. Fastened to the shaft $h$ above the rotary plate $k$ is a vertically adjustable head $q'$ having depending arms $r'$ and supported by the arms $r'$ are bearing boxes $s'$ for the inner ends of the shafts $t'$ of the rolls $z$. The bearing boxes $s'$ are vertically movable in slideways $u'$ forming part of the arms $r'$ and are vertically adjustable by set screws $v'$ inserted through the lower ends of the arms $r'$ to engage the under surface of the bearing boxes. Pressing upon the top surface of the bearing boxes $s'$ are tension springs $w'$ fitted with caps $x'$ and inserted through the top of the arms $r'$ are set screws $v^3$ which engage the caps $x'$. In the standards $a$ are slideways $z'$ and vertically movable in the slideways $z'$ are bearing boxes $a''$ for the outer ends of the shafts $t'$. At the lower ends of the slideways $z'$ are webs $b''$ through which are vertically adjustable the set screws $c''$ to engage the bearing boxes $a''$ and vertically adjust them relatively to the bearing boxes $s'$ so that the shafts $t'$ can be positioned to maintain the bottom surface of the rolls $z$ parallel with the top surface of the filter screen $x$. Pressing upon the top of the bearing boxes $a''$ are tension springs $d''$ fitted with caps $e''$ and vertically adjustable through the top of the standards are set screws $f^3$ to engage the caps and regulate the tension of the springs $d''$ upon the bearing boxes.

Mounted upon the shafts $t'$ are bevel gear wheels $f'''$ meshing with a crown wheel $g''$ carried by the rotary plate $k$. The bevel wheels $f'''$ are mounted on the shafts $t'$ adjacent to the head $q'$ and the crown wheel $g''$ is positioned upon the rotary plate $k$ to be continuously in mesh with the teeth of all the bevel wheels $f'''$ to cause the simultaneous revolution of all the rolls $z$. Inclosing the bevel gear wheels $f'''$ is the inner tub side $h''$ and concentric with the inner tub side $h''$ between the standards $a$ and rolls $z$ is the outer tub side $i''$. The inner tub side $h''$ rests upon the top surface of the filter bed near the inner edge thereof and is suspended from the arms $f$ of the top plate $e$ by hangers $j'''$ fitted with adjusting nuts $k''$ by which it can be accurately adjusted to the top surface of the filter bed and rigidly held in its adjusted position.

The outer tub side $i''$ is suspended from the annular top plate $e$ by hangers $l''$ fitted with adjusting nuts $m''$ by which it can be accurately adjusted to the top surface of the clamping plate $c'$ and rigidly held in its suspended position. Attached to the side faces of the standards $a$ are L-shaped lugs $o''$ having apertures through which are inserted the outer ends of the adjusting bolts $p''$ fitted with adjusting nuts $q''$. The inner ends of the adjusting bolts $p''$ are connected to the outer tub side $i''$ to adjust it inwardly or outwardly and rigidly hold it in its adjusted position. As shown in Fig. 3, the shafts $t'$ pass through the inner and outer tub sides at an inclination to the horizontal plane thereof and the apertures in the tub sides are of sufficiently greater dimensions than the shafts to permit of a limited adjustment thereof. As shown in Figs. 1 and 2, the apparatus is divided into two sections, each containing four rolls, a hopper $r''$ through which the suspended solids are delivered to the machine and a conveyer screw $t''$. At the side of each conveyer screw $t''$ remote from its respective squeezing rolls is a partition $v''$ to arrest the progress of the suspended solids. The roll $z$ adjacent to the hopper $r''$ is adjusted away from the filter screen $x$ sufficiently to permit of the suspended solids passing between them, but sufficiently close to the filter screen to squeeze a portion of the water therefrom. The second roll is adjusted nearer to the filter screen $x$ than the first mentioned roll and the third roll is still closer, and the last mentioned roll is in close contact with the filter screen. By this arrangement of rolls the water contained in the suspended solids can be gradually pressed from them through the filter screen $x$, filter plate $v$ and filter bed $t$ into the annular drain $q$ which delivers the water into the trough $x''$. The trough $x''$ is supported from the standards $a$ by braces $z''$ and is fitted with a drain pipe or pipes A through which the water flows away. The suspended solids after passing the last roll $z$ are carried by the filter screen to the partitions which scrape them from the filter screen into piles so that the conveyer screws $t''$ may engage them and deliver them from the filter press through the openings $A'$.

The operation of both sets of rolls is similar to that above described. By employing two hoppers $r''$ with a set of squeezing rolls and a conveyer screw for each hopper and partitions separating the sets of squeezing rolls and conveyer screws, it is possible to deliver the suspended solids simultaneously to both sets of rolls which will then simultaneously perform the functions of squeezing the absorbed water from the suspended solids or it is possible to deliver the suspended solids to one set of rolls and permit the other set to remain idle or to remove one of the partitions and employ all the rolls to operate on the suspended solids delivered to the filter press through the one hopper. The partitions $v''$ are located on the sides of their respective conveyer screws remote from their respective rolls to arrest the carriage of the suspended solids by the filter screens beyond the conveyer screws so that the conveyer screws will be able to perform the function of gathering and removing the suspended solids from the apparatus. The partitions $v''$ as shown in Fig. 2, are removably contained in slideways B in the inner faces of the tub sides. Journaled in bearing boxes C connected to the annular bed plate $b$ and to the annular top plate $e$ are vertical shafts D having pinion wheels F meshing with the teeth of the annular spur wheel $o$ and fixed on the vertical shafts D are bevel pinion wheels G which mesh with the bevel pinion wheels H mounted upon a counter shaft I journaled in bearings suspended from the annular top plate $e$. Mounted upon the counter shafts I are sprocket wheels J and mounted upon the shafts of the conveyer screws $t''$ are sprocket wheels K. Passing around the sprocket wheels J and K are sprocket chains L.

During the operation of the machine, motion is transmitted to the annular spur wheel $o$ which revolves in the direction indicated by arrow in Fig. 1, of the drawings, revolving the filter bed, filter plate, filter screen and rotary plate $k$ in the same direction. The revolution of the filter bed and rotary plate $k$ causes the revolution of the crown wheel $g''$ in the same direction as the annular spur wheel $o$. The revolution of the crown wheel $g''$ revolves the bevel gear wheels $f''$, shafts $t'$ and rolls $z$ in the direction indicated by arrow in Fig. 1, so that the rolls and filter screen will drag the suspended solids between them and carry them past the rolls $z$. Motion is transmitted by the annular spur wheel $o$ to the pinion wheels F and vertical shafts D and from the vertical shafts D to the counter shafts I by means of the bevel pinion wheels G and H. The revolution of the counter shafts cause the revolution of the sprocket wheel J and this motion of the sprocket wheels J is transmitted to the conveyer screws by the agency of the sprocket chains L.

Having thus fully described my invention what I claim as new and desire to secure by Letters Patent is:

1. A filtering machine comprising a central member, a peripheral member encompassing the central member, and separated therefrom by an intervening space, a filter supported by said members and bridging said space, and squeezing rolls opposed to said filter.

2. A filtering machine comprising a central member, a peripheral member encompassing the central member, and separated therefrom by an intervening space, a filter bridging said space, and supported by said members, means for removably holding said filter in position and squeezing rolls opposed to said filter.

3. A filtering machine comprising a central member, a peripheral member encompassing the central member, and separated therefrom by an intervening space, a filter supported by said members and bridging said space, squeezing rolls opposed to said filter, and a trough supported by said members below the filter.

4. A filtering machine comprising a central member, a peripheral member encompassing the central member, and separated therefrom by an intervening space, a filter bridging said space, and supported by said members, means for removably holding said filter in position, squeezing rolls opposed to said filter, and a trough supported by said members below the filter.

5. A filtering machine comprising a central member, a peripheral member encompassing the central member, and separated therefrom by an intervening space, a filter bridging said space and supported by said members, means for causing the revolution of said members, and squeezing rolls opposed to said filter.

6. A filtering machine comprising a central member a peripheral member encompassing the central member, and separated therefrom by an intervening space, a removable filter bridging said space, and supported by said members means for removably holding the filter in position, and squeezing rolls opposed to said filter.

7. A filtering machine comprising a shaft, a rotary plate revoluble around said shaft, an annular spur wheel concentric with the rotary plate and separated therefrom by an intervening space, a filter connected to the rotary plate and to the annular spur wheel to bridge the intervening space between them, squeezing rolls opposed to the filter bed and means for causing the revolution of the spur wheel, filter bed and rotary plate.

8. A filtering machine comprising a revoluble plate, an annular spur wheel encompassing said plate, and separated therefrom by an intervening space, a filter connected to said plate, and spur wheel, squeezing rolls opposed to the filter, and means for causing the revolution of the spur wheel, filter, and plate, and other means for causing the revolution of the squeezing rolls.

9. A filtering machine comprising a revoluble plate, an annular spur wheel encompassing said plate, and separated therefrom by an intervening space, a filter connected to said plate and spur wheel, squeezing rolls opposed to the filter, means for causing the revolution of the spur wheel, filter, plate, and other means for causing the revolution of the squeezing rolls, and means for adjusting the squeezing rolls to the filter.

10. A filtering machine comprising a revoluble plate, an annular spur wheel encompassing the revoluble plate, and separated therefrom by an intervening space, a removable filter bridging said space, means for removably holding the filter in place, squeezing rolls opposed to the filter, means for causing the revolution of the annular spur wheel, filter, and plate, and means for causing the revolution of the squeezing rolls.

11. A filtering machine comprising a stationary shaft a rotary plate revoluble around said shaft, means on said shaft for maintaining the rotary plate in a fixed horizontal plane, an annular spur wheel encircling the rotary plate and separated therefrom by an intervening space, a perforated filter bed connected to the annular spur wheel and rotary plate and bridging said space, a filter plate supported upon the filter bed, idlers supporting the annular spur wheel, means for causing the revolution of the spur wheel, filter bed and rotary plate, squeezing rolls opposed to the filter bed and means for causing the revolution of the squeezing rolls.

12. A filtering machine comprising a stationary shaft a rotary plate revoluble around said shaft, means on said shaft for maintaining the rotary plate in a fixed horizontal plane, an annular spur wheel encircling said rotary plate and separated therefrom by an intervening space, a perforated filter bed connected to the annular spur wheel and rotary plate and bridging said space, a filter plate supported upon the filter bed composed of a number of removable filter plate sections, means for removably holding the filter plate sections in their fixed positions upon the filter bed, idlers supporting the annular spur wheel means for causing the revolution of the spur wheel, filter bed and rotary plate, squeezing rolls opposed to the filter bed and means for causing the revolution of the squeezing rolls.

13. A filtering machine comprising a stationary shaft a rotary plate revoluble around said shaft, means on said shaft for maintaining the rotary plate in a fixed horizontal plane, an annular spur wheel encircling said rotary plate and separated therefrom by an intervening space, a perforated filter bed connected to the annular spur wheel and rotary plate and bridging said space, a filter plate and bridging said space, a filter plate supported upon the filter bed, idlers supporting the annular spur wheel, means for causing the revolution of the spur wheel, filter bed and rotary plate, squeezing rolls opposed to the filter bed, means for causing the revolution of the squeezing rolls, and means for adjusting the squeezing rolls to the filter bed.

14. A filtering machine comprising a stationary shaft a rotary plate revoluble around said shaft, means on said shaft for maintaining the rotary plate in a fixed horizontal plane, an annular spur wheel encircling said rotary plate and separated therefrom by an intervening space, a perforated filter bed connected to the annular spur wheel and rotary plate and bridging said space, a filter plate supported upon the filter bed, composed of a number of removable filter plate sections, means for removably holding the filter plate sections in their fixed positions upon the filter bed, idlers supporting the annular spur wheel, means for causing the revolution of the spur wheel, filter bed and rotary plate, squeezing rolls opposed to the filter bed, means for causing the revolution of the squeezing rolls, and means for adjusting the squeezing rolls to the filter bed.

15. A filtering machine comprising a stationary shaft, a collar vertically adjustable upon the shaft, a rotary plate revoluble around said shaft and supported by said collar, an annular spur wheel encircling the rotary plate and separated therefrom by an intervening space, idlers to support the annular spur wheel, an annular drain connected to the rotary plate and to the spur wheel and protruding through the space intervening between them, a filter bed bridging the intervening space above the drain, a filter plate supported by the filter bed composed of a number of removable filter plate sections, a clamping means for each filter plate section to removably hold it in its fixed position, squeezing rolls opposed to the filter surface of the filter plate, adjustable bearings for the shafts of the squeezing rolls whereby they can be adjusted to the filter surface, tension springs engaging the bearings of the squeezing rolls to hold them in their adjusted position, a crown wheel carried by the rotary plate, bevel wheels mounted upon the shafts of the squeezing rolls meshing with the crown wheel, and tub sides inclosing the squeezing rolls adjustable to the filter bed.

16. A filtering machine comprising a stationary shaft a collar vertically adjustable upon the shaft, a rotary plate revoluble around said shaft and supported by said collar, an annular spur wheel encircling the rotary plate and separated therefrom by an intervening space, idlers to support the annular spur wheel, an annular drain connected to the rotary plate and to the spur wheel and protruding through the space intervening between them, a filter bed bridging the intervening space above the drain, a filter plate supported by the filter bed composed of a number of removable filter plate sections, a clamping means for each filter plate section to removably hold it in its fixed position, squeezing rolls opposed to the filter surface of the filter plate, adjustable bearings for the shafts of the squeezing rolls whereby they can be adjusted to the filter surface, tension springs engaging the bearings of the squeezing rolls to hold them in their adjusted position, a crown wheel carried by the rotary plate, bevel wheels mounted upon the shafts of the squeezing rolls meshing with the crown wheel, tub sides inclosing the squeezing rolls adjustable to the filter bed, and a trough located below the drain.

17. A filtering machine comprising a revoluble plate, an annular spur wheel encompassing said plate, and separated therefrom by an intervening space, a filter connected to said plate, and spur wheel, squeezing rolls opposed to the filter, means for causing the revolution of the spur wheel filter, and plate, other means for causing the revolution of the squeezing rolls, and a trough supported by the annular spur wheel and plate below the filter.

18. A filtering machine comprising a revoluble plate, an annular spur wheel encompassing said plate, and separated therefrom by an intervening space, a filter connected to the said plate and spur wheel, squeezing rolls opposed to the filter, means for causing the revolution of the spur wheel, filter and plate, other means for causing the revolution of the squeezing rolls, means for adjusting the squeezing rolls to the filter, and a trough supported by the annular spur wheel and plate below the filter.

19. A filtering machine comprising a revoluble plate, an annular spur wheel encompassing the revoluble plate, and separated therefrom by an intervening space, a removable filter bridging said space, means for removably holding the filter in place, squeezing rolls opposed to the filter, means for causing the revolution of the annular spur wheel, filter and plate, means for causing the revolution of the squeezing rolls, and a trough supported by the annular spur wheel and plate below the filter.

Toronto, April 14th, 1906.

JOHN MILLS.

Signed in the presence of—
    CHAS. H. RICHES,
    H. L. TRIMBLE.